United States Patent [19]

Ahn

[11] 4,449,724
[45] May 22, 1984

[54] TELESCOPIC TANKER FOR CARRYING FLUID

[76] Inventor: Min H. Ahn, 5111 Maple Rd., Richmond, British Columbia, Canada

[21] Appl. No.: 375,794

[22] Filed: May 7, 1982

[51] Int. Cl.³ ............................................... B60P 3/22
[52] U.S. Cl. ...................................... 280/5 C; 220/8
[58] Field of Search ............ 280/5 C, 5 D, 5 E, 5 R, 280/80 B; 220/8, 22

[56] References Cited

U.S. PATENT DOCUMENTS

| | | | |
|---|---|---|---|
| 2,438,434 | 3/1948 | Friedman | 220/8 |
| 2,887,243 | 5/1959 | Murdock, Sr. | 220/8 |
| 3,407,836 | 10/1968 | Keiser | 280/5 E |
| 3,463,501 | 8/1969 | Field | 280/5 D |

*Primary Examiner*—David M. Mitchell
*Assistant Examiner*—Donn McGiehan
*Attorney, Agent, or Firm*—Townsend and Townsend

[57] ABSTRACT

A telescopic tanker for carrying fluid which has a wheel-mounted, extendible chassis with a first tank section and at least one other tank section that is telescopingly received within the first section. The tank sections are movable between their telescoped and untelescoped positions, and the tanker is adapted to be attached to a towing vehicle.

15 Claims, 13 Drawing Figures

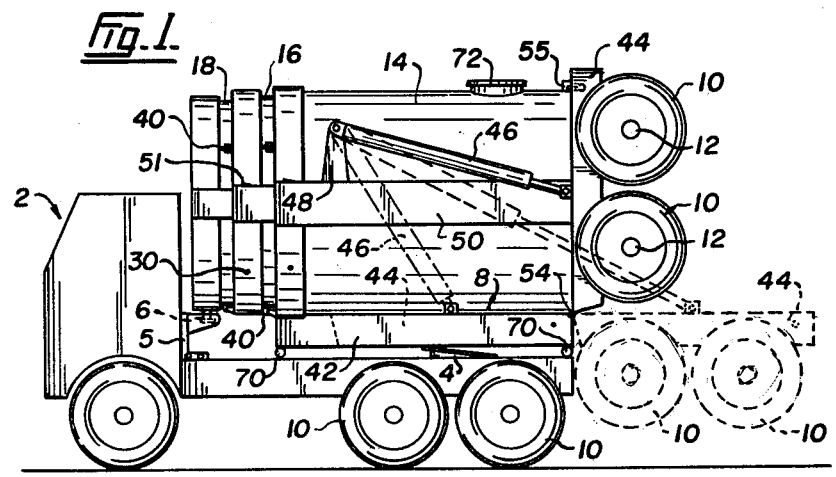
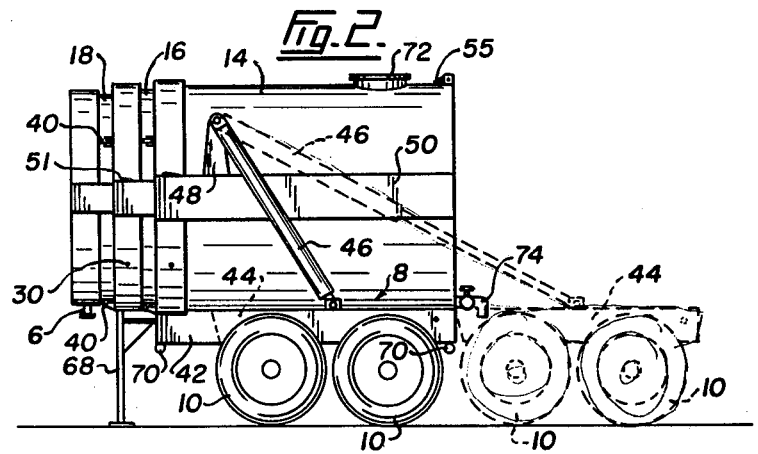
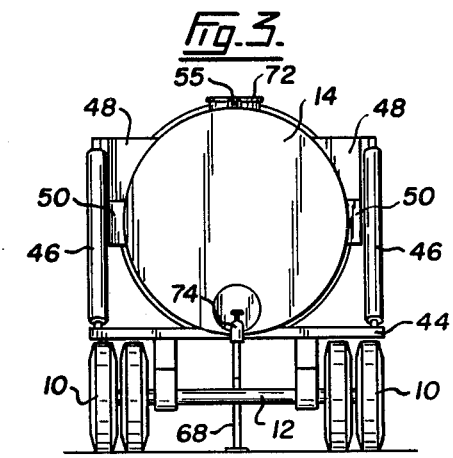

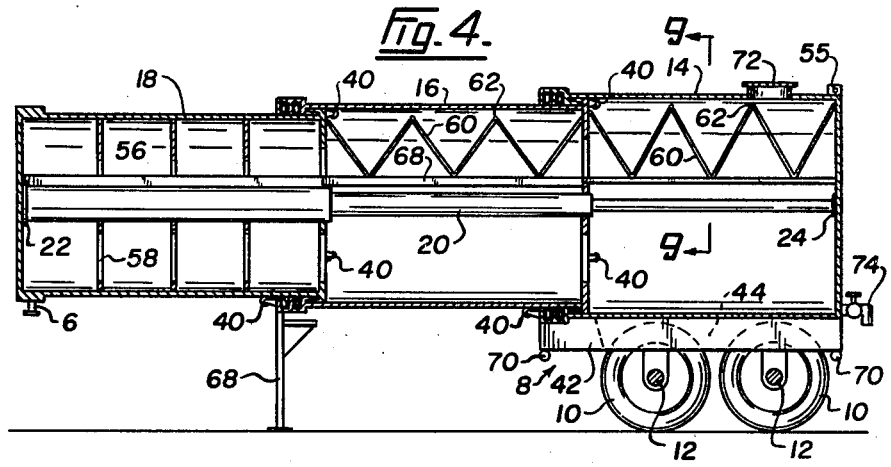
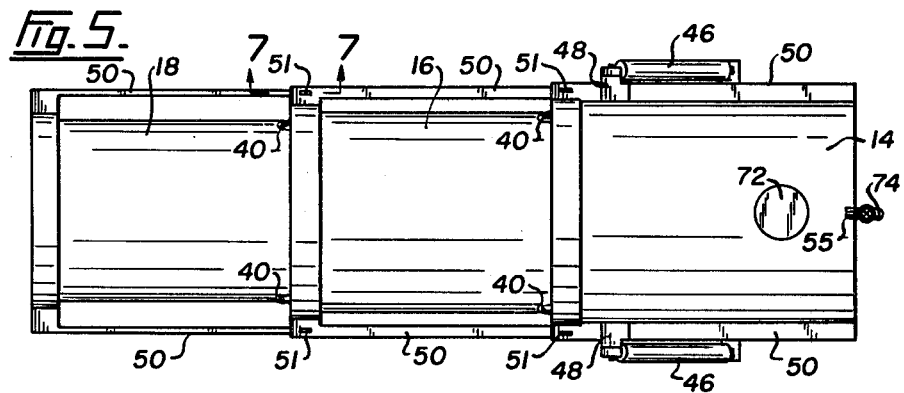
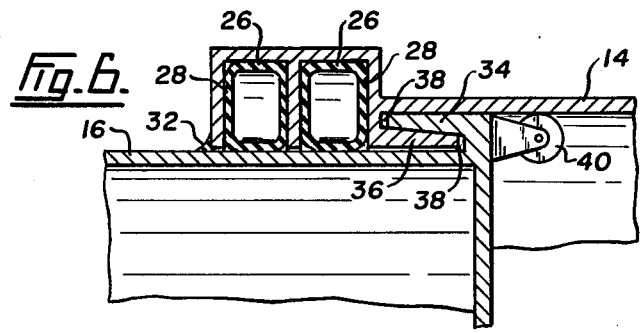
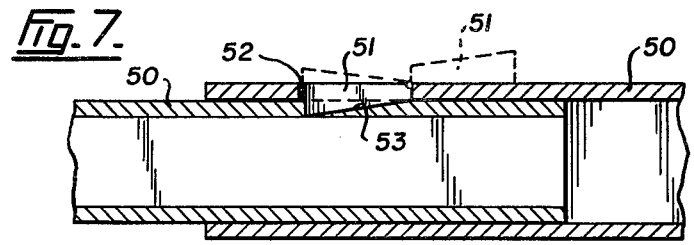

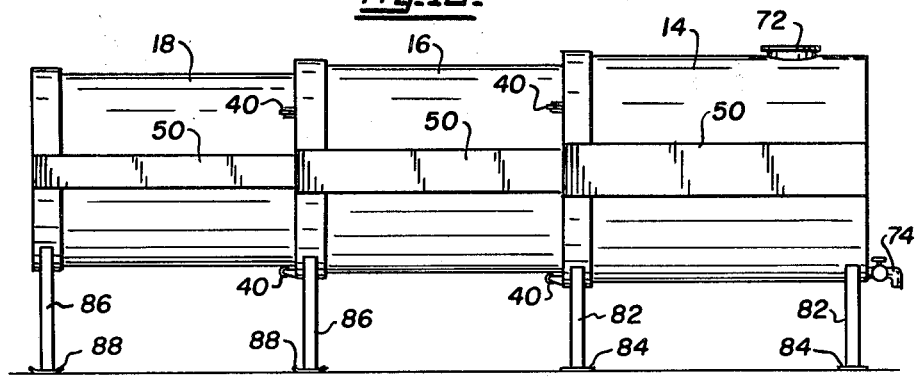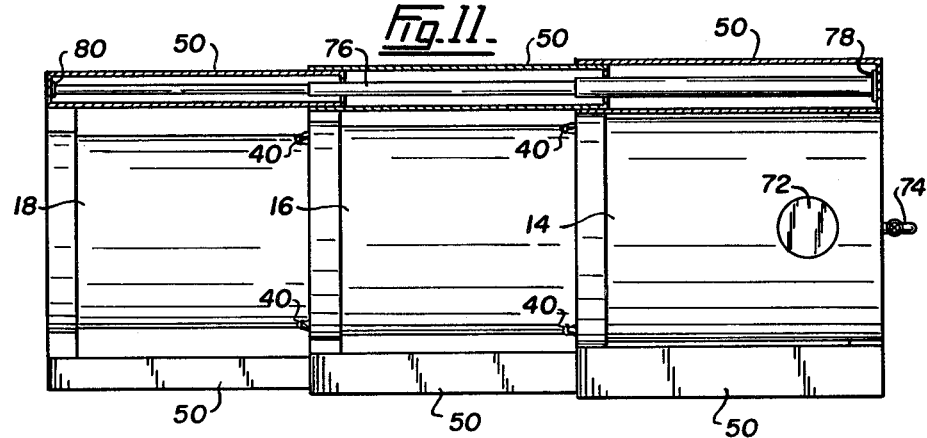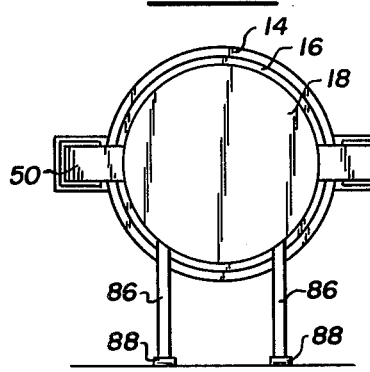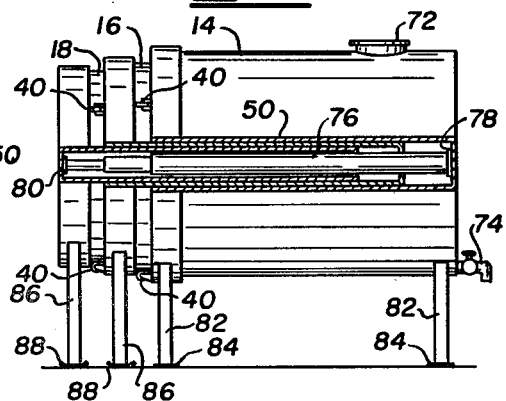

TELESCOPIC TANKER FOR CARRYING FLUID

FIELD OF THE INVENTION

This invention relates to a tanker for carrying fluids, that is a liquid or a gas.

DESCRIPTION OF THE PRIOR ART

The carrying of fluids in tankers is well known. The tankers used are invariably large, particularly for commonplace liquids and gases such as gasoline, milk and propane. Generally speaking it is necessary that the tankers be large, particularly when the material carried is relatively cheap, if the road transport of such liquids and gases is to be economical.

The maneuverability of such large tankers is difficult. Furthermore, the parking of such tankers occupies a substantial amount of space and this is so even when the vehicles are empty.

The present invention is based on the belief that although clearly the tanker must be of full capacity when carrying a load it is desirable that it be much smaller when the load has been emptied and the tanker is either parked or is being driven empty, for example to pick up another load.

Another feature of tankers is that they are almost exclusively vehicles designed as tankers. That is they have no other use. However, the use of pulling vehicles having a so-called fifth wheel to be attached to a trailer is extremely well known in road transport. The present invention also seeks to produce a tanker that can be towed behind such a vehicle.

SUMMARY OF THE INVENTION

Accordingly, the present invention provides a tanker comprising a chassis, wheels mounted on the chassis, a first section to contain a fluid, at least one other section able to telescope within the first section, means to move the sections between a telescoped and an untelescoped position; and means to attach the tanker to a towing vehicle.

BRIEF DESCRIPTION OF THE DRAWINGS

Aspects of the invention are illustrated, by way of example, in the accompanying drawings in which:

FIG. 1 is a side elevation of a tanker according to the present invention;

FIG. 2 illustrates the tanker self-supported;

FIG. 3 is a rear view of the tanker of FIG. 2;

FIG. 4 is a section, in elevation, of a tanker extended;

FIG. 5 is a plan view of the extended tanker;

FIG. 6 is a detail of the tanker;

FIG. 7 is a detail on the line 7—7 in FIG. 5;

FIG. 10 is an elevation of a further embodiment of the invention;

FIG. 11 is a plan view, partially in section, of the embodiment of FIG. 10;

FIG. 12 is an end view of the embodiment of FIG. 10; and

FIG. 13 is an elevation, partly in section, of the embodiment of FIG. 10 in the compressed state.

DESCRIPTION OF THE PREFERRED EMBODIMENTS

Figure 8:
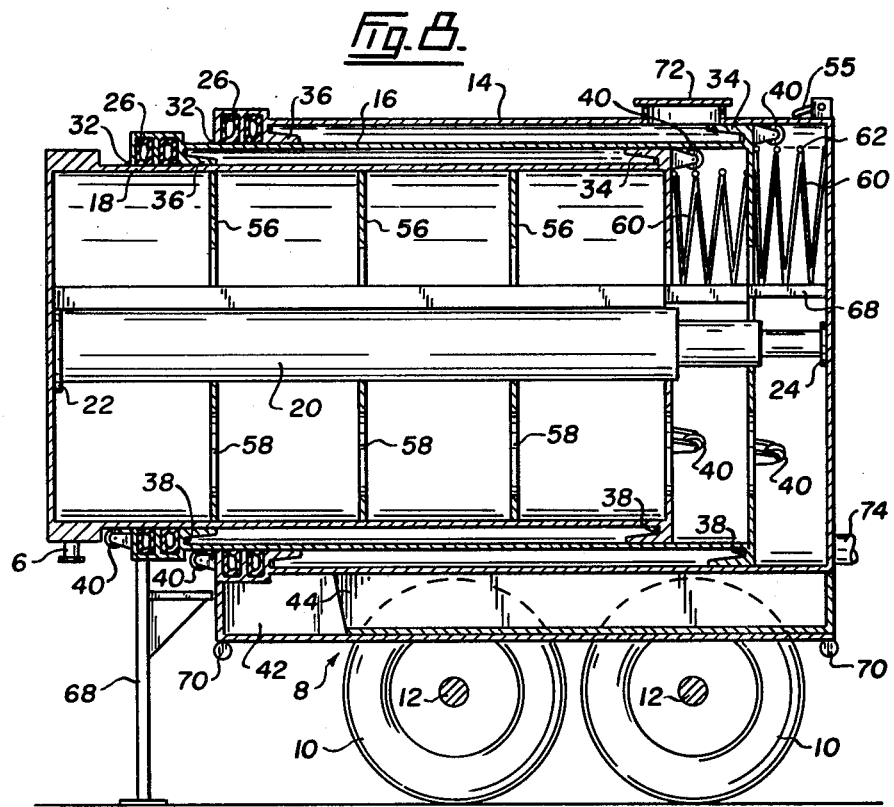
FIG. 8 is a section through the tankers of the invention.

FIGS. 1 to 9 of the drawings illustrate a tanker to be towed behind a towing vehicle 2 including a fifth wheel 4 and a housing 5. The tanker is provided with a connector 6 to engage in the fifth wheel 4 in conventional manner.

The tanker comprises a chassis 8 that is extendible as illustrated in FIGS. 1, 2 and 4 between a load carrying position, the position show most clearly in FIG. 4, where the chassis 8 is not extended, to a storage position, the position shown in FIGS. 1 and 2 in broken lines. There are wheels 10 mounted on the chassis 8 on axles 12 in conventional manner.

The tanker comprises a first tank section 14 mounted on the chassis 8. A second tank section 16 is able to telescope within the first section 14 and a third tank section 18 is able to telescope within the second tank section 16. This telescoping is induced by a hydraulic ram 20 mounted within the third section 18 at 22 and attached to the first section 14 at 24. By the feed of hydraulic fluid in conventional manner the hydraulic ram 20 can be extended or retracted to extend or retract the sections 14 and 16 and thus the tanker.

When the tanker is extended there are seals formed where the sections meet. As shown particularly in FIG. 6 these seals comprise inflatable tubes 26 arranged within peripheral spaces 28 at an end of the section. The spaces are provided with openings 30 as shown in FIG. 2 so that the tubes 26 may be inflated and deflated. There are auxiliary seals 32 again as shown particularly in FIG. 6.

FIG. 6 also illustrates two other features of the invention. First the ends of each section are formed with correspondingly shaped members 34 and 36 and these members are mutually engageable to stabilize the extended sections. Further sealing members 38 are provided at the end of each shaped member to preserve the seal.

Guide wheels 40 are mounted on the end of each section to contact the inner wall of the adjoining section as shown in FIGS. 4 and 6. As also shown in FIGS. 1, 2 and 8 these guide wheels 40 also contact the exterior of an adjacent section so that, for example, the wheels may be arranged at 60° spacings around the circumference of a tank section, three inside and three outside a section.

FIG. 1 and FIG. 2 in particular illustrate that the chassis is extensible and comprises first members 42 attached to the first section 14 and second members 44 each attached to a first member 42 and able to telescope relative to the first member 42. The wheels 10 are mounted on the second members 44 and there are means to move the second members 44 inwardly and outwardly relative to the first members 42. In the preferred embodiment illustrated this means comprises a hydraulic cylinder 46 mounted on members 42 and attached to arms 48 mounted on telescopic reinforcing bars 50 for the sections. The arrangement is such that by extension from the position shown in FIG. 2 the second members 44 of the chassis 8 are moved outwardly to extend the wheels 10 to the position shown in broken lines in FIG. 2. The chassis 8 is stabilized when extended by members 34 and 36 and the section 14, 16 and 18 are kept from inadvertent retraction by pivotal keys 51 attached to the outer bars 50 to extend through an opening 52 in the outer bar to engage a recess 53 in the inner bar, see FIG.

7. FIG. 1 also illustrates that having reached that position a pivotal joint 54 may be made, for example by the insertion of a hinge pin through hingedly formed ends on each of the first and second members. Retraction of the hydraulic ram 46 can then pull the second member 44 of the chassis 8 upwardly to the storage position shown in FIG. 1. Anchoring means in the form of a hook 55 shown in FIGS. 1, 2 and 8 can then be attached from the top of the tank to the end of the second member to maintain the second members in the raised position shown in FIG. 1.

Figure 9:
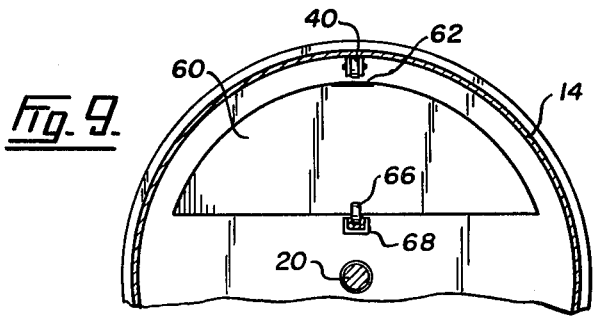
FIG. 9 is a detail on the line 9—9 of FIG. 4.

FIGS. 4 and 9 illustrate the presence of surge baffles within the tanker. In the third section 18, which does not receive another section, the baffles may be conventional permanently formed baffles 56 having openings 58. However, in the second and third sections 14 and 16 the baffles must be collapsible so as not to interfere with the telescoping action of the tanker. Accordingly, the baffles comprise a plurality of members 60 each attached to a neighbour by hinge joints 62. At the bottom, and as shown particularly in FIG. 9, the mutually attached baffles are provided with a wheel 66 which engages in a track 68 extendible from the third section 18, with the extension of the ram 20, to the first section 14. By this simple arrangement it is assured that the baffles 60, which only occupy the top of the tank in the illustrated embodiment of FIG. 4, are extended to their useful, baffle position when the hydraulic ram 20 is used to extend the tanker.

The tanker is provided with a conventional stand 68, conventional that is for a trailer, so that it may be freestanding when not located by the fifth wheel 4. It is also provided with rollers 70 at the ends of first members 42 of chassis 8. An inlet 72 and an outlet 74 are provided.

FIGS. 1 to 9 thus illustrate a telescope tanker that can be filled at its rest position, for example as shown in FIG. 4, simply by extending the ram 20 and then filling the tanker in conventional manner through a filler, not shown. A truck 2 is then backed in position so that the fifth wheel 4 engages the connector 6, the stand 68 is collapsed and the tanker may be towed to its desired destination.

At its destination the tanker is emptied in conventional manner. To store the tanker the truck 2 is removed after disconnecting the fifth wheel and setting down stand 68. With stand 68 down ram 20 is contracted to telescope the sections together. Stand 68 may be provided with a wheel at its base to facilitate the movement of section 16 over section 18.

To carry the tank in the position shown in FIG. 1 first hydraulic ram 46 is extended to move wheels 10 to the position shown in broken lines in FIG. 2. Joint 54 is locked. A ramp is positioned behind truck 2 supporting the leading roller 70 on the trailer. The trailer is then winched or pushed forward until it reaches the position shown in FIG. 1. The trailer tips forward gradually as the wheels 10 come onto the ramp. When rear rollers 70 reach the position shown in FIG. 1, on the chassis side members of truck 2, the connector 6 is located in housing 5. Joint 54 is released so that it can pivot. Ram 46 is retracted to pull second members 44 and wheel 10 to the position shown in FIG. 1. Hook 55 is joined to locate them in that position. The truck may then be driven away.

To lower the tanker from the FIG. 1 position the ramp is placed at the rear of the truck. Hook 55 is released and ram 46 extended. Connector 6 is released from housing 5. The tanker is then moved with a brake applied, down the ramp. When in position on the ground stand 68 is erected and the ramp removed. The truck 2 may then be backed in to connect the fifth wheel 4. The tank may be extended before or after attachment of the fifth wheel be extension of the ram 20. Keys 51 are pivoted to lock the section in the extended position.

FIGS. 10 to 13 illustrate an embodiment of the invention generally similar to the embodiment of FIGS. 1 to 9 but not necessarily to be carried by a vehicle. A further important feature is that the internal available volume in the embodiment of FIGS. 10 to 13 is larger. The hydraulic ram 20 of the embodiment of FIGS. 1 to 9 is replaced by twin hydraulic rams 76 located at 78 and 80. Operation of these rams is precisely as the operation of the ram 20 shown in the embodiment of FIGS. 1 to 9. Hydrualic ram 76 is located within telescopic members 50, members that are also shown in the embodiment of FIGS. 1 to 9.

In addition the embodiment of FIGS. 10 to 13 is provided with supports all along its length. The first section 14 is provided with legs 82 having flat feet 84. However, the sections 16 and 18 are provided with legs 86 provided with skids 88 to allow the tank to be extended and retracted while it stands on the ground.

The embodiment of FIGS. 10 to 13 does not, of course, have a chassis as it is not normally meant to be towed by a vehicle. However, in this regard it should be noted that it may be stood on the chassis of a vehicle by use of the feet 84 and skids 88. It may be located on the vehicle by any conventional means.

The embodiments of FIGS. 10 to 13 also provide a tank that can be stretched to provide excellent volume and yet, when stored, is compact and thus occupies little space.

I claim:

1. A tanker comprising:
   a chassis;
   wheels mounted on the chassis;
   a first section to contain a fluid;
   at least one other section able to telescope within the first section;
   means to move the sections between a telescoped and an untelescoped position;
   means to attach the tanker to a towing vehicle;
   said chassis being extendible and comprising;
   first members attached to the first section;
   second members each able to telescope relative to a first member;
   said wheels being mounted on the second members;
   means to move the second members inwardly and outwardly relative to the first members.

2. A tanker as claimed in claim 1 in which the second members are each pivotally attachable to a first member when the second members are extended outwardly.

3. A tanker as claimed in claim 2 including a hydraulic cylinder able first to extend the chassis and, secondly, to pivot the second members upwardly relative to the first and, subsequently, downwardly relative to the first members.

4. A tanker as claimed in claim 3 including means to locate the second members in the upwardly pivoted position.

5. A tanker as claimed in claim 1 comprising three sections, a first section relatively small to be received in the second section which, in turn, can be received within a third section.

6. A tanker as claimed in claim 1 having guide wheels formed in each section to guide the sections during the telescoping motion.

7. A tanker as claimed in claim 6 in which the guide wheels are arranged within and without each section.

8. A tanker as claimed in claim 1 including seals between the sections.

9. A tanker as claimed in claim 8 in which the seals are inflatable tubes arranged within peripheral spaces at an end of a section.

10. A tanker as claimed in claim 1 including correspondingly shaped members on each section, mutually engageable to stabilize the extended sections.

11. A tanker as claimed in claim 1 including antisurge baffles in the first section.

12. A tanker as claimed in claim 1 including collapsible antisurge baffles in the other section.

13. A tanker as claimed in claim 12 in which the antisurge baffles are provided with rollers at their lower edges;
an extendible track to engage the rollers;
hinged joints between adjacent baffles, remote from the extendible track, to allow a section to telescope without interference from the baffles.

14. A tanker as claimed in claim 1 in which the means to move the sections between a telescoped and an untelescoped position comprises a double acting hydraulic ram.

15. A tanker for use in carrying fluids and adapted to be towed behind a towing vehicle including a fifth wheel the trailer being adapted to telescope and to be carried on the towing vehicle when empty and telescoped, the tanker comprising
a chassis extendible between a load carrying position and a storage position;
wheels mounted on the chassis;
a first tank section mounted on the chassis;
a second tank section able to telescope within and without a first section;
a third tank section able to telescope within and without the second tank section;
a hydraulic ram mounted within the third section and attached to the first section whereby the tanker can be telescoped;
seals formed where the telescoping sections meet in the extended position;
guide means formed within and without each section to guide the sections during telescoping;
a hydraulic ram mounted on the first tank and attached to the chassis and able to extend the chassis or retract the chassis, as required, and to pivot and raise the extended chassis to move the wheels against the first section;
means to locate the chassis in the raised position; and
extendible means to allow the tanker to become free standing.

* * * * *